United States Patent
Eddington

(10) Patent No.: US 8,328,995 B2
(45) Date of Patent: Dec. 11, 2012

(54) METHOD FOR PRODUCING A DISTILLATE STREAM FROM A WATER STREAM CONTAINING AT LEAST ONE DISSOLVED SOLID

(75) Inventor: Michael J. Eddington, Overland Park, KS (US)

(73) Assignee: Black & Veatch Holding Company, Overland Park, KS (US)

( * ) Notice: Subject to any disclaimer, the term of this patent is extended or adjusted under 35 U.S.C. 154(b) by 937 days.

(21) Appl. No.: 11/704,779

(22) Filed: Feb. 9, 2007

(65) Prior Publication Data

US 2007/0215453 A1 Sep. 20, 2007

Related U.S. Application Data

(60) Provisional application No. 60/773,045, filed on Feb. 14, 2006.

(51) Int. Cl.
*B01D 1/26* (2006.01)
*B01D 1/28* (2006.01)
*B01D 3/06* (2006.01)
*C02F 1/06* (2006.01)

(52) U.S. Cl. ......... 203/10; 159/2.1; 159/17.2; 159/20.2; 159/24.3; 159/47.1; 159/DIG. 8; 202/155; 202/174; 202/176; 202/182; 202/202; 203/24; 203/26; 203/27; 203/75; 203/78; 203/88; 203/98; 203/100; 203/DIG. 8

(58) Field of Classification Search .............. 159/2.1, 159/17.2, 17.3, 20.2, 24.1, 24.2, 24.3, 47.1, 159/DIG. 8; 202/155, 174, 176, 182, 202; 203/10, 24, 26, 27, 75, 78, 88, 98, 100, DIG. 8

See application file for complete search history.

(56) References Cited

U.S. PATENT DOCUMENTS

| | | | | |
|---|---|---|---|---|
| 1,620,163 | A * | 3/1927 | Milliff et al. | 208/352 |
| 1,954,371 | A * | 4/1934 | Tarte et al. | 203/94 |
| 3,147,072 | A | 9/1964 | Thomsen | |
| 3,171,268 | A * | 3/1965 | Silver | 62/498 |
| 3,398,534 | A * | 8/1968 | Hucks, Jr. | 60/648 |
| 3,446,712 | A | 5/1969 | Othmer | |
| 3,607,668 | A | 9/1971 | Williamson | |
| 3,649,469 | A | 3/1972 | MacBeth | |
| 3,941,663 | A | 3/1976 | Steinbruchel | |
| 4,018,656 | A | 4/1977 | Rogers et al. | |
| 4,046,639 | A | 9/1977 | Carson | |
| 4,072,579 | A | 2/1978 | Carson | |
| 4,094,747 | A | 6/1978 | Pfenninger | |
| 4,238,296 | A | 12/1980 | Sadhukhan | |
| 4,310,387 | A | 1/1982 | Sadhukhan | |
| 4,376,679 | A | 3/1983 | Liu | |
| 4,898,107 | A * | 2/1990 | Dickinson | 110/346 |
| 5,329,758 | A * | 7/1994 | Urbach et al. | 60/775 |

(Continued)

OTHER PUBLICATIONS

"The ABCs of Desalting" by O.I. Buros, International Desalination Association, Topsfield, Mass., Second Edition, 1990, Updated 2000.

(Continued)

*Primary Examiner* — Virginia Manoharan
(74) *Attorney, Agent, or Firm* — Hovey Williams LLP

(57) ABSTRACT

A method and a system to produce a distillate stream from an aqueous stream containing at least one dissolved solid by a thermal distillation process using at least one of a heated aqueous stream from a turbine system intercooler and a stack heater as a heat source.

13 Claims, 4 Drawing Sheets

U.S. PATENT DOCUMENTS

| | | | |
|---|---|---|---|
| 5,395,483 | A | 3/1995 | Al-Hawaj |
| 5,622,605 | A | 4/1997 | Simpson et al. |
| 5,645,693 | A | 7/1997 | Gode |
| 5,853,549 | A | 12/1998 | Sephton |
| 5,925,223 | A | 7/1999 | Simpson et al. |
| 6,309,513 | B1 | 10/2001 | Sephton |
| 6,349,563 | B1 | 2/2002 | Kinoshita |
| 7,037,430 | B2 * | 5/2006 | Donaldson et al. ............ 210/652 |
| 2003/0121856 | A1 | 7/2003 | Voutchkov |
| 2004/0103637 | A1 | 6/2004 | Maisotsenko et al. |
| 2007/0017207 | A1 * | 1/2007 | Smith et al. ................. 60/39.182 |
| 2007/0215453 | A1 * | 9/2007 | Eddington ...................... 203/10 |

OTHER PUBLICATIONS

*Fundamentals of Salt Water Desalination*, by Hisham T. El-Dessouky and Hisham M. Ettouney, Kuwait University, Elsevier Science B.V., 2002, pp. 81-85, 110-113, 129-131, 260-269, 2002.

"Understand Thermal Desalination," by Hisham T. El-Dessouky and Hisham M. Ettouney, Kuwait University, Chemical Engineering Progress, Sep. 1999.

"Seawater Multi-effect Distillation Energized by a Combustion Turbine," by Victor Dvornikov, Elsevier Science B.V., 2000.

"Comparison of Multiple Effect Distillation and Reverse Osmosis for New Providence Island," by E. George Moss, Edwin T. Hunt and Curtis A. Kiefer, Proposal, 1993.

"Experimental Heat Transfer Analysis of Multiple-Effect Desalination Pilot Plant," by Dae-Jun Chang, Hyun-Sung Choi, Gil-Ju Jung, Yang-Gyu Kim, Sand-Kune Lee and Seok-Lyong Song, International Desalination Association, Abstract BAH03-099, 2003.

* cited by examiner

METHOD FOR PRODUCING A DISTILLATE STREAM FROM A WATER STREAM CONTAINING AT LEAST ONE DISSOLVED SOLID

RELATED CASES

This application is entitled to and hereby claims the benefit of the filing date of U.S. provisional application No. 60/773,045 entitled "A Method For Producing A Distillate Stream From A Water Stream Containing At Least One Dissolved Solid" filed Feb. 14, 2006 by Michael J. Eddington.

FIELD OF THE INVENTION

The present invention relates to the production of a distillate stream from a water stream containing at least one dissolved solid, such as seawater, brine, brackish water and the like, by a thermal distillation process using a heated aqueous stream from at least one of a compressor intercooler, a stack heater and the like, as a heat source.

BACKGROUND OF THE INVENTION

In many parts of the world, potable water is in short supply. Many processes have been proposed and used to remedy this shortcoming by producing potable water from brackish water, brine, seawater and the like. Such processes are typically used to recover distillate from water which contains at least one dissolved solid material. Typically the water fed to such processes is filtered to remove particulates before charging to the process with the dissolved solids being removed by distillation to produce a distillate and a brine stream which is carrying the dissolved solids.

Widely used processes of this type include multi-effect distillation processes, multi-stage flash processes, reverse osmosis and the like, as disclosed in "Understand Thermal Desalination," Ettouney, Hisham M., El Dessouky, Hisham T., and Alatiqi, Imad, Chemical Engineering Progress, September, 1999. These distillation processes have long been used to produce distillate from feed water streams containing dissolved materials. These processes have been used for the production of desalinated (distillate) water from seawater, salt water, brackish water and the like. Basically, such thermal distillation processes use one or a series of vessels (effects or stages) and use the principles of evaporation, flashing and condensation at reduced pressure in the various effects.

Processes using a single vessel are known but more commonly multi-vessel systems are used commercially to produce distillate. Single vessel systems are more widely used on ships and the like. Various designs have been used for the heat exchangers in such distillation processes, such as horizontal tubes with a falling water film on the outside, vertical tubes with a falling water film on the inside or plates with falling water films and the like. Also various methods for adding feed water to multi-vessel distillation systems are known and used widely.

The thermal efficiency of these processes depends in part upon the number of vessels which may vary from one to 35 or more vessels. These vessels require a heat source to supply an initial source of heat which is carried through the system to produce additional distillate in each of the vessels. This heat has been supplied for thermal distillation processes by a variety of systems, such as the use of steam, mechanical vapor compression, thermal vapor compression, absorption vapor compression, adsorption vapor compression, and the like. Such processes are well known to those skilled in the art for use in multi-effect distillation processes. The commercial utility of such processes frequently depends upon the ability to obtain heat from a low cost source to enable the evaporation and flashing of the water in the various vessels to produce the distillate economically.

Compressor intercoolers are commonly used in gas compressors, air compressors and compressor sections of turbine systems to reduce the energy required while compressing a fluid. An intercooler is a heat exchanger that cools a hot compressed fluid from a preceding compressor stage before entering a subsequent stage of compression, thereby decreasing the work necessary in the subsequent compression. It is desirable to provide a low temperature cooling fluid to the intercooler to optimize the temperature reduction of the compressed fluid entering the intercooler and thus minimize the work of compression in the subsequent compressor stages as appropriate. Generally the intercooler may be cooled by an air or water stream with the heat supplied by the intercooler simply rejected to the environment.

When an intercooler is employed with a turbine system, the stream compressed is an air stream. Hot air from the low-pressure compressor enters the intercooler where the air is cooled by heat exchange with a cooler stream. The cooled air is then returned to the high-pressure compressor for further compression. The final compressed air stream is then mixed with a fuel stream and the mixture is combusted and expanded in a turboexpander which produces shaft power which may be used to drive the compressor and to produce electricity or the like. The hot exhaust gas stream produced in the turbine may be used in a heat recovery system to produce a heated stream, such as steam or the like, which is usable to drive a turboexpander or the like to produce additional shaft energy which may be used to drive an electric generator, produce additional power or the like. Such systems are well known to those skilled in the art and do not require extensive discussion.

Typically the energy recovered by a heat recovery section is limited by the sulfur content of the fuel which is burned in the combustion turbine. Use of low sulfur fuels, such as natural gas, can maximize the amount of heat recovered in the heat recovery section allowing lower exhaust gas temperatures than the exhaust gas temperatures of high sulfur fuels, such as fuel oil. This is due to the exhaust gases from a combustion turbine which burn low sulfur fuels having a lower sulfuric acid dew point. Heat recovery sections typically employ recirculation systems or the like to maintain an exhaust gas temperature above the water or the sulfuric acid dew point in order to minimize corrosion of the lower temperature parts in the heat recovery section.

SUMMARY OF THE INVENTION

According to the present invention, a method is provided for producing a distillate stream from an aqueous stream containing at least one dissolved solid by a thermal distillation process using at least one heated aqueous stream heated by at least one of a compressor intercooler or a stack heater as a heat source and optionally a heated stream from another heat source, the method comprising: passing an aqueous stream containing at least one dissolved solid to the thermal distillation process comprising a plurality of vessels; heating an aqueous stream by heat exchange with the heat source to produce a heated aqueous stream; and, passing the heated aqueous stream to the thermal distillation process as at least one of a heat source and a feed water stream.

The invention further comprises a system for producing a distillate stream from a water stream containing at least one dissolved solid using a heated aqueous stream from a compressor intercooler as a heat source, the system comprising: a compressor intercooler heat exchanger; a multi-effect distillation system comprising a plurality of effects, each of the effects comprising a vessel, a condenser, a condensate collector and a fluid transport apparatus for passing fluids to, from and between effects; a water inlet to a feed inlet to the multi-effect distillation system; a distillate recovery and condensation system for recovering distillate from the multi-effect distillation system and passing a portion of the distillate to an inlet to the intercooler to produce a heated distillate stream; and, a conduit for passing the heated distillate stream to an inlet to the multi-effect distillation system.

The invention further comprises a system for producing a distillate stream from a water stream containing at least one dissolved solid using a heated aqueous stream from a compressor intercooler as a heat source, the system comprising: a compressor intercooler heat exchanger; a multi-effect distillation system comprising a plurality of effects, each of the effects comprising a vessel, a heat exchanger and a fluid transport apparatus for passing fluids to, from and between effects; a water inlet to a feed inlet to the multi-effect distillation system; a distillate recovery and condensation system for recovering distillate from the multi-effect distillation system; a conduit for passing a stream containing at least one dissolved solid to the intercooler to produce a heated water stream; and, a conduit for passing the heated water stream to an inlet to the multi-effect distillation system.

The invention further comprises a system for producing a distillate stream from a water stream containing at least one dissolved solid using a heated aqueous stream from a compressor intercooler as a heat source, the system comprising: a compressor intercooler heat exchanger; a multi-stage flash system comprising a plurality of stages, each of the stages comprising a vessel, a condenser, a condensate collector and a fluid transport apparatus for passing fluids to, from and between stages; a water inlet to a feed inlet to the multi-stage flash system; a distillate recovery and condensation system for recovering distillate from the multi-stage flash system and passing a portion of the distillate to an inlet to the intercooler to produce a heated distillate stream; and, a conduit for passing the heated distillate stream to an inlet to the multi-stage flash system.

The invention further comprises a system for producing a distillate stream from a water stream containing at least one dissolved solid using a heated aqueous stream from a compressor intercooler as a heat source, the system comprising: a compressor intercooler heat exchanger; a multi-stage flash system comprising a plurality of stages, each of the stages comprising a condenser, a condensate collector and a fluid transport apparatus for passing fluids to, from and between stages; a water inlet to a feed inlet to the multi-stage flash system; a distillate recovery and condensation system for recovering distillate from the multi-stage flash system; a conduit for passing a stream containing at least one dissolved solid to the intercooler to produce a heated water stream; and, a conduit for passing the heated water stream to an inlet to the multi-stage flash system.

Alternatively a heated aqueous stream from a heat exchange zone heated by a hot exhaust stream from a turbine or the like or a heated aqueous stream from a turboexpander could be used in lieu of or in addition to the heated aqueous stream from the intercooler. Any of these streams could be used alone or with all or any of the other streams to produce a heated aqueous stream as a heat source in the embodiments disclosed above.

Heat exchange between an aqueous stream and either the intercooler or the heat exchange zone or both may be via an intermediate heat transfer fluid and requisite heat exchangers.

DESCRIPTION OF PREFERRED EMBODIMENTS

In the discussion of the Figures, the same numbers will be used throughout to refer to the same or similar components. Further it is noted that many pumps, valves, non-condensable gas removal equipment, pressure exchangers, vapor compressors, and the like necessary to achieve the flows shown have not been shown for simplicity since such equipment is well known to those skilled in the art.

Figure 1:
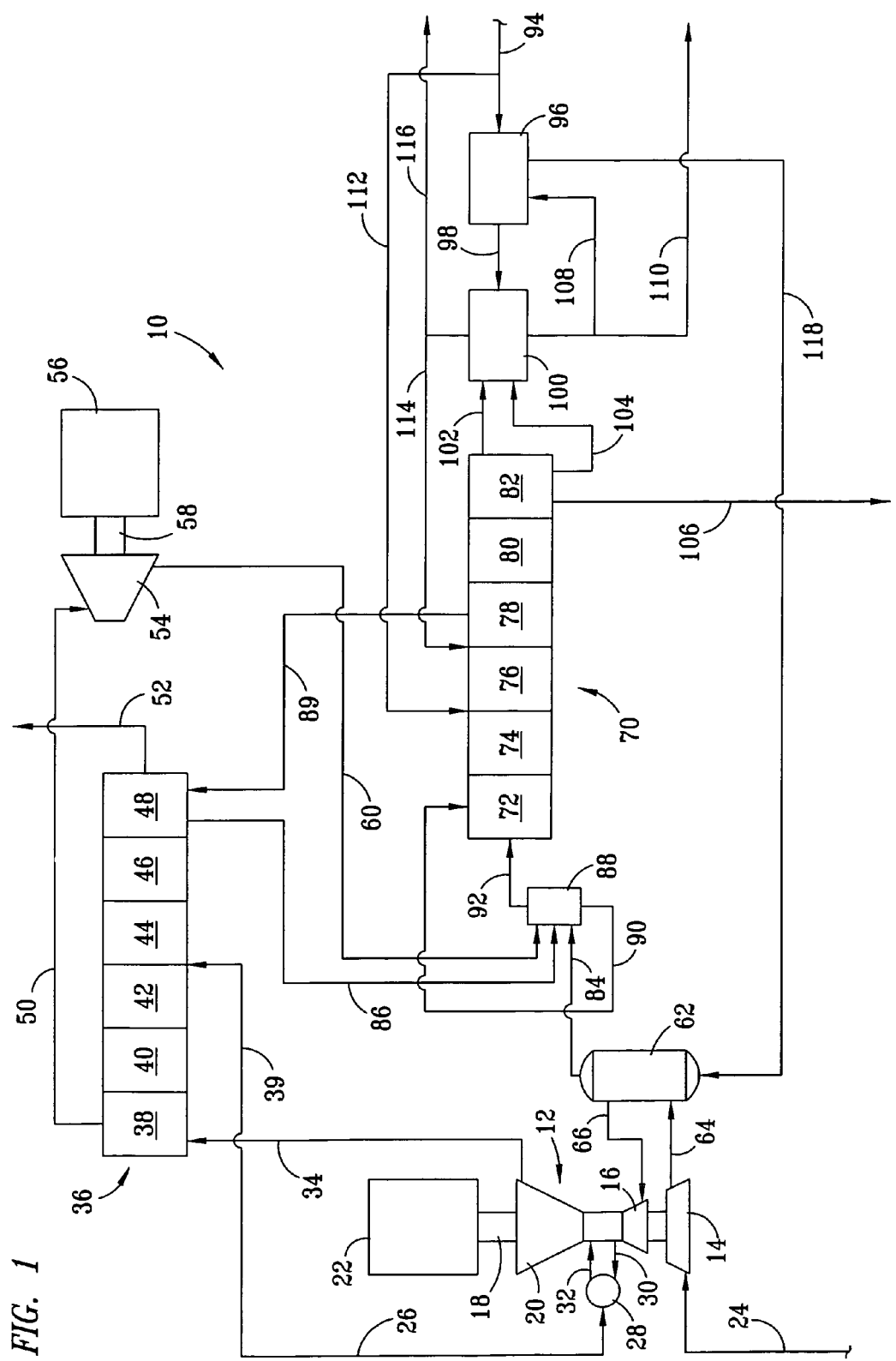
FIG. 1 is a schematic diagram of an embodiment of the process of the present invention wherein distillate is used for heat capture for a multi-effect distillation process.

In FIG. 1 a process is shown which includes a turbine system 12 for the production of electric power which includes a low-pressure compressor 14, a high-pressure compressor 16, an intercooler 62, a combustor 28, a turboexpander 20 and an electrical generator 22. Systems of this type are well known to those skilled in the art and will not be further discussed in detail.

The hot exhaust gas from turbine system 12 is utilized in a heat recovery system 36 in which heat is recovered from the exhaust gas stream in a plurality of heat exchange zones 38, 40, 42, 44, 46 and 48 to produce steam which is passed to a steam stream in line 50. The heat recovery system 36 could consist of more or less exchange zones and various streams may be used between the various heat exchange zones and the like. A water stream is charged to heat recovery system 36 via a line 39. The cooled exhaust gas is discharged with appropriate treatment through a line 52. The recovered steam, line 50, is passed to a steam turbine 54 or the like which is shaft coupled via a shaft 58 to an electric generator 56 which produces electricity with a fluid stream 60 containing one or both of steam and condensate produced by the water charged through line 39 being recovered through a line 60. Systems of this type are well known to the art and will not be discussed in detail.

Also known to those skilled in the art is the use of an intercooler 62, as shown to receive a hot air stream 64 from a discharge of low-pressure compressor 14 for cooling and return to an inlet 66 of a high-pressure compressor 16. As noted previously, typically an economical heat exchange substance is used to cool the hot air in intercooler 62. Fluids are as varied as air, water, and various other heat exchange fluids have been used for this purpose.

A multi-effect distillation system is shown at 70. The multi-effect distillation system includes effects 72, 74, 76, 78, 80 and 82. The multi-effect distillation system could include more or fewer effects and various streams may be passed between the effects as known to those skilled in the art.

A stream of water containing a dissolved solid, such as seawater from a line 98, is supplied via a line 94 to a distillate cooler 96. In distillate cooler 96 a primarily liquid distillate stream from a line 108 is cooled to a relatively low temperature, typically below about 95° F. and passed through a line 118 to intercooler 62 as a cooling stream. It may not be necessary in all instances to use distillate cooler 96 if sufficient cooling can be achieved in a distillate condenser 100 or if a higher temperature in the distillate stream can be tolerated in the heat exchange fluid for intercooler 62. Other methods of cooling the stream to intercooler 62 may also be used. In distillation condenser 100, distillate from the multi-effect distillation section is shown as recovered from the final effect 82. A stream 102 is recovered which is typically primarily distillate vapor with a stream being recovered through a line 104 which is typically mixed distillate vapor and distillate. The proportion of vapor and liquid in these streams may vary but in any event, the vapor streams are condensed in distillate condenser 100 against the seawater stream and the distillate is recovered via line 110. The distillate passed to distillate cooler 96 is further cooled to provide a cooler heat exchange fluid for intercooler 62.

A distillate stream 110 is produced as a product distillate stream. The heated seawater is recovered through a line 114 with a portion of the heated seawater being passed through line 114 as an inlet water stream to the multi-effect distillation system. As well known to those skilled in the art, this water can be added at various points or at a single point in the system. A portion of the heated seawater is discharged through a line 116 back to the sea or to other use as desired. A brine stream is discarded from the multi-effect distillation system via a line 106.

Multi-effect distillation systems are considered to be well known to those skilled in the art and operate in a variety of modes. For instances, the system may be designed as a feed forward, parallel feed, parallel/cross feed or the like. The inlet water may be charged to the first effect or may be divided between the effects and the like. The effects may be oriented horizontally or vertically. In addition, multi-effect distillation systems can include thermal vapor compression, mechanical vapor compression or the like. Other multi-effect distillation systems can be based upon absorption or adsorption distillation processes. The present invention is considered applicable to these various multi-effect distillation systems. As indicated previously, the operation of such systems is well known to those skilled in the art.

According to the present invention, the distillate stream heated in intercooler 62 is passed via a line 84 to a flash zone 88 where it may be separated into a vaporous stream recovered through a line 92 and passed to a heat exchanger as a heat exchange fluid in the multi-effect distillation system and a liquid stream passed via a line 90 to the multi-effect distillation system. As shown, the vaporous components of this stream are charged via line 92 to a heat exchanger in first effect 72. The liquid portion of the stream is recovered through line 90 and may be passed to first effect 72 as a liquid. It will be understood that these streams could be introduced to one or a plurality of vessels in a plurality of ways if desired. As shown, both the liquid and the vaporous components of the stream from line 92 are charged to first effect 72.

A second stream may be charged to vessel 72 via a line 86. This stream is produced by withdrawing an intermediate distillate stream from the multi-effect distillation process via a line 89 and passing it to section 48 of the heat recovery system 36. Alternatively a seawater stream supplied to line 89 via line 114 may be considered, along with an appropriate flash box system or the like. This section is arbitrarily selected depending upon the desired temperature in the stream in line 86. Typically the intermediate stream withdrawn through line 89 is withdrawn at a temperature of about 120 to about 140° F. with the stream being heated in section 48 to a temperature from about 200 to about 300° F. As discussed previously, the optimal temperature for the stream depends on the fuel burned, with low sulfur fuels allowing lower temperatures. The return temperature is chosen to maximize the economic utilization of the available heat in the exhaust gas of the turbine system in order to utilize the remaining heat from the turbine system exhaust gas which would otherwise be wasted. This stream can be flashed in flash zone 88 with the same separation being made as discussed for the heated stream in line 84 or it could alternatively be passed back to the individual sections.

A further option is the use of the stream from line 60. This line represents exhaust vapor and condensate from turboexpander 54. This stream may be passed to the first effect 72 and charged as a heating stream or supplied as a motive steam to a thermal vapor compressor.

Desirably the temperature in line 60 is at or near the saturation temperature of the first effect 72. Similarly the temperature in line 84 is from about 200 to about 350° F.

By the use of the process shown in FIG. 1, a distillate stream is used for the heat exchange fluid in intercooler 62. This reduces the tendency toward fouling and the like in heat exchanger 62 and provides the desired cooling. The heat is desirably recovered at intercooler 62 and used in the multi-effect distillation process as discussed to produce distillate, which is a desirable product in many areas.

Figure 2:
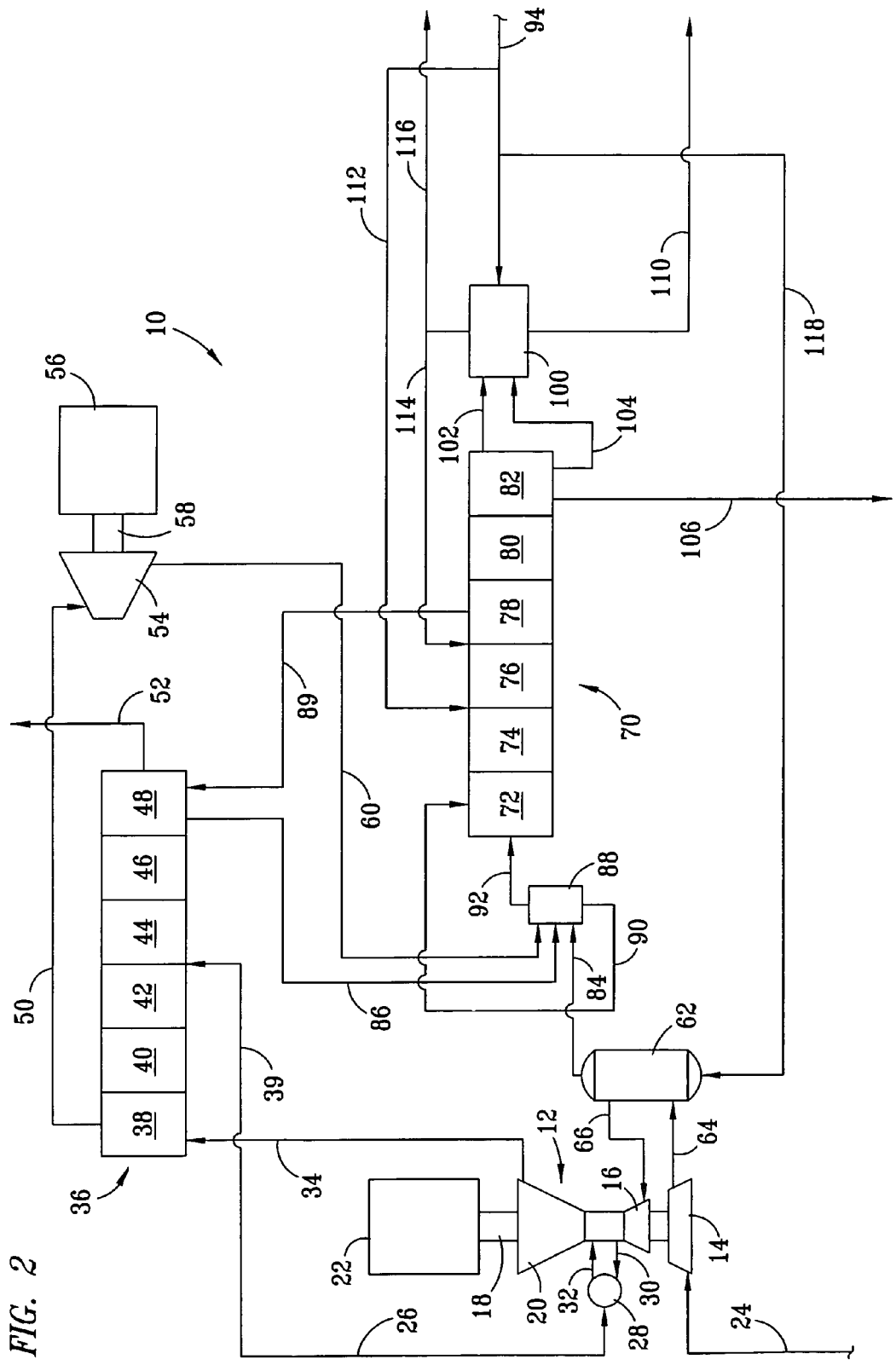
FIG. 2 shows a second embodiment of the present invention wherein seawater is used for heat capture for a multi-effect distillation process.

Alternatively, an embodiment of the process shown in FIG. 2 could be used. In this embodiment, there is no distillate cooler 96 since the seawater is charged directly through line 118 to intercooler 62. By this process a cooler stream is passed to intercooler 62. The seawater, as introduced, is typically cooler than the distillate produced in distillate cooler 96. The seawater may require more costly materials of construction than the use of distillate.

Figure 3:
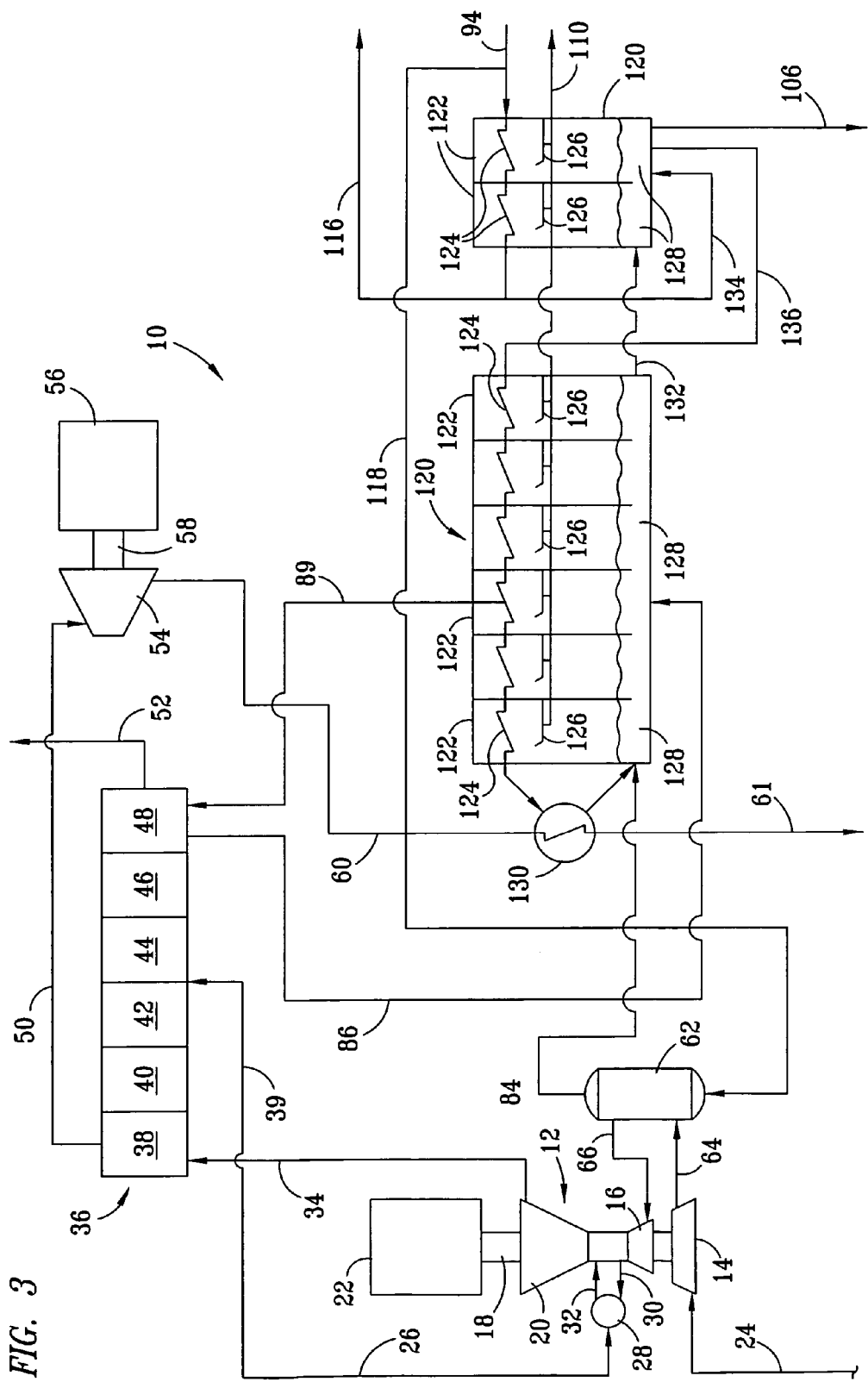
FIG. 3 shows a further embodiment of the present invention which includes a multi-stage flash system which uses seawater for heat capture; and, FIG. 4 shows an embodiment which includes, a multi-stage flash system wherein distillate is used for heat capture.

In FIG. 3 a preferred embodiment which comprises a multi-stage flash system is shown. The multi-stage flash system includes a plurality of stages 122, only a portion of which are numbered. Each stage includes a condenser section 124 through which a cooling fluid is passed. A brine pool 128 at a suitable temperature and pressure for flashing passes through the bottom of each stage 122 and flashes (evaporates) to produce vapor which is condensed by condensers 124 to produce distillate which is collected in a plurality of condensate collectors 126 and recovered as a distillate product. In the embodiment shown, seawater is supplied through a line 94.

It will be understood that the reference to seawater is illustrative only and the water could be seawater, brine, brackish water or any other aqueous solution containing dissolved material.

The seawater is introduced through line 94 with a portion of the water being passed to a line 118 for use to cool the intercooler 62 and produce heated feed water which passes via a line 84 into the multi-stage flash process. A portion of the seawater, after use to produce distillate in two of the latter stages, as shown, may be passed to discharge via a line 116. A further portion of the seawater is passed to condensers 124 and eventually passed to a heat exchanger 130. Here the seawater is further heated in heat exchanger 130 by heat exchange with a stream from line 60, which is a discharge stream from a turboexpander 54 used to drive an electric generator or the like. The cooled water from line 60 is passed via a line 61 to return as a steam condensate, which may be discarded, returned to the heat recovery section 36 or the like. The heated water is then passed into the process as a brine pool 128 at a temperature suitable to flash in the stages which are operated at a decreasing pressure and decreasing temperature as the liquid flows through the successive stages.

The heat rejection (shown as the two last stages) is accomplished by charging a portion of seawater as a cooling fluid to the condensers with the heated seawater from the heat rejection stages being in part discarded and in part recycled via a line 136 as part of the cooling fluid passed to the condensers in the remaining stages.

The operation of such vessels is well known to those skilled in the art and need not be discussed in detail except to note that many variations in the operation of such vessels are possible. The operation of these processes has been discussed at some length in the article entitled "Understand Thermal Desalination," as cited above.

By the process of the present invention, an intermediate stream may be removed through a line 89 and passed to a relatively low temperature portion of the heat recovery system 36 wherein heat is recovered from the exhaust from turbine 20. This stream is heated in section 48 and returned to one of the intermediate sections of the multi-stage flash process via line 86.

Desirably the temperature of stream 89 as removed is from about 120 to about 140° F., with the temperature of the return stream 86 being from about 160 to about 250° F. Desirably the temperature of a stream in line 84 is from about 200 to about 350° F. Desirably the cooling flail recovered from the multi-stage flash process and heated in heat exchanger 130 is returned to the process at a temperature from about 175 to about 250° F. or higher. As discussed previously, the most desirable temperatures can vary dependent upon other process conditions and the like.

By the process discussed above, seawater is used for heat recovery from intercooler 62. This can result in fouling or other contamination of the heat exchange surfaces in intercooler 62 and the like. While the seawater stream is readily processed by the multi-stage flash process, it may result in more frequent cleaning of intercooler 62 and the like.

Figure 4:
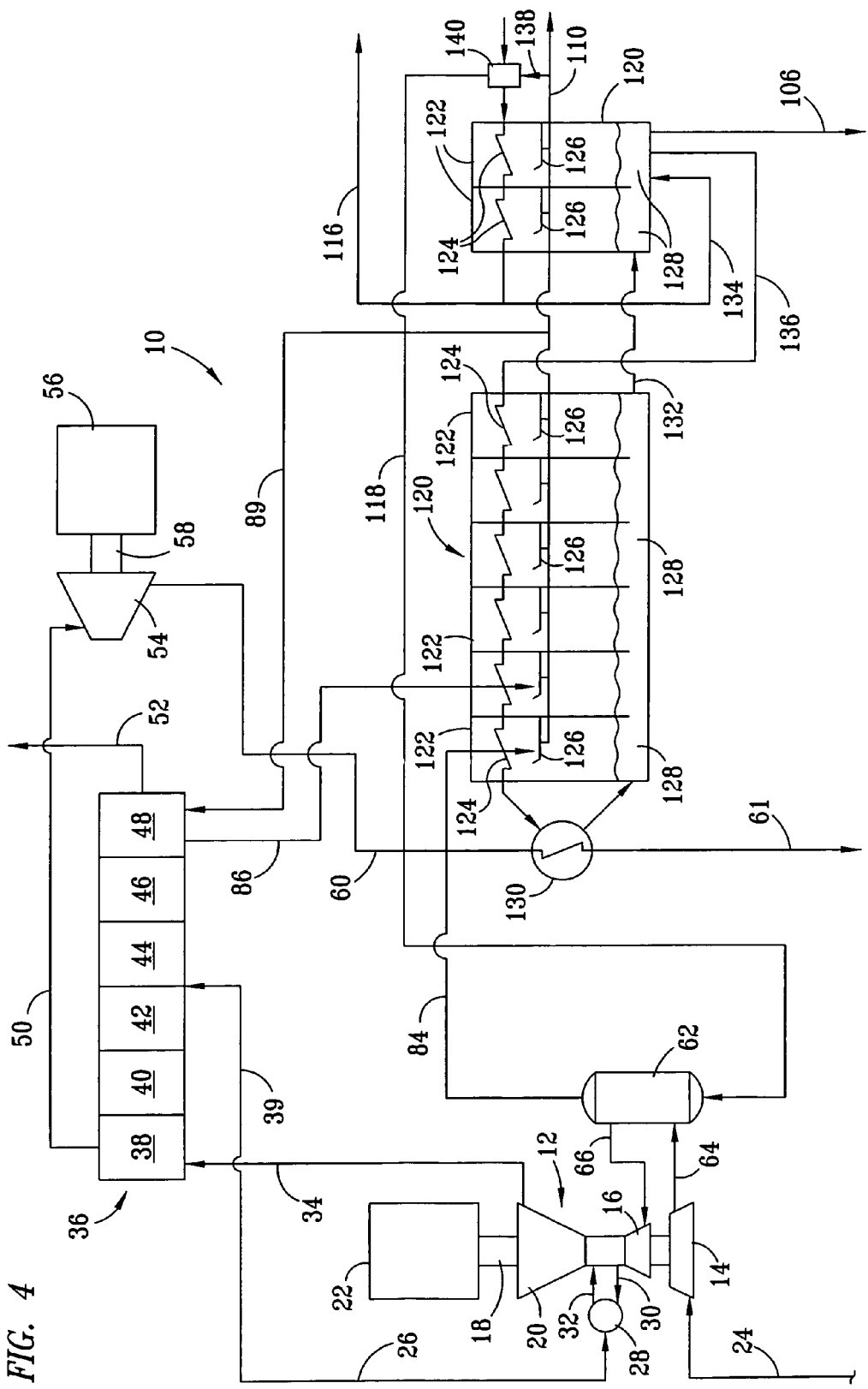

In FIG. 4 a similar process is shown but a heat exchanger 140 is provided to use seawater as a coolant to cool a portion of the distillate which is then passed via a line 118 to heat exchange in intercooler 62. This stream is then returned to an early stage of the multi-stage flash process, herein shown as the first stage.

As discussed previously, the coolant is heated in heat exchanger 130 and passed to the process to form the brine pool from which the distillate is recovered. As shown, the streams in lines 84 and 86 are returned to the distillate collectors in the stages to which they are returned. These streams constitute distillate which has been removed at various stages in the process and used for heat recovery to provide heat to the multi-stage flash process.

Either the multi-effect distillation process or the multi-stage flash process can be used effectively according to the present invention.

The preceding figures illustrate a process in which a combined cycle power plant is integrated with a desalination plant by utilizing heat from a gas turbine intercooler and a heat recovery system. However, it is recognized that other processes can be developed which also utilize the heat from an intercooler and/or a heat recovery system for use in a desalination plant. Processes can also be developed which utilize either of these heat sources. Such a process may include a simple cycle power plant integrated with a desalination plant by also utilizing heat from a gas turbine intercooler and a heat recovery system or optionally only from one of a gas turbine intercooler (or a heat recovery system). Such a heat recovery system may be used with or without a turboexpander or the like.

It would readily be appreciated by those skilled in the art that the amount of high quality heat required to produce distillate from seawater and the like should be minimized. The process of the present invention allows greater water production from the distillation system by the introduction of heat sources from the turbine and heat recovery systems which would otherwise be wasted. The use of these heat sources from in the power plant result in a highly efficient process which utilizes sources of heat not readily utilized in the power plant.

The streams introduced to flash box 88 in FIGS. 1 and 2 are illustrative only. Other methods of introducing these streams or the location within the desalination system at which they are introduced or removed may be utilized to optimize the particular desalination system configuration or operating conditions.

The combination of these features has resulted in a surprisingly superior process which utilizes a heat source which is frequently a waste heat stream to produce a second valuable by-product.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. In a method for producing a distillate stream from a first aqueous stream containing at least one dissolved solid by a multi-effect distillation process by heating at least a portion of the first aqueous stream by a heat source and passing the portion of the first aqueous stream to a multi-effect distillation process, the multi-effect distillation process comprising a plurality of vessels, the improvement comprising; heating the portion of the first aqueous stream by heat exchange with a heat source comprising a compressor intercooler or a stack heater to produce a first heated aqueous stream and passing the first heated aqueous stream to the multi-effect distillation process as at least one of a heat supply and a feed water stream to produce the distillate stream, wherein a second aqueous stream containing at least one dissolved solid is withdrawn from the multi-effect distillation process at a selected temperature and passed to heat exchange with an exhaust gas stream in a heat recovery system to produce a second heated aqueous stream containing at least one dissolved solid at an increased temperature and returned to the multi-effect distillation process and wherein the first heated aqueous stream is passed to the multiple effect distillation process via a flash box.

2. The improvement of claim 1 wherein the multi-effect distillation process includes a plurality of effects each containing, a heat exchanger and a fluid transport apparatus for passing fluids to, from and between effects, a feed inlet and a heating fluid inlet into the heat exchanger.

3. The improvement of claim 1 wherein the heat source comprises a compressor intercooler.

4. The improvement of claim 1 wherein the multi-effect distillation process is selected from the group consisting of thermal vapor compression, mechanical vapor compression, adsorption vapor compression and absorption vapor compression arrangements.

5. The improvement of claim 1 wherein the multi-effect distillation process is selected from the group consisting of a feed forward, parallel, and a parallel cross/cross flow arrangement.

6. The improvement of claim 1 wherein the first aqueous stream containing at least one dissolved solid is seawater.

7. The improvement of claim 6 wherein the seawater is heated prior to charging the seawater to the multi-effect distillation process.

8. The improvement of claim 7 wherein the seawater is heated by heat exchange with the distillate stream from a multi-effect distillation process to produce a cooled liquid distillate stream.

9. The improvement of claim 1 wherein the first aqueous stream passed to heat in the heat source is seawater.

10. The improvement of claim 1 wherein the first heated aqueous stream is selected from a heated distillate stream and a heated seawater stream.

11. The improvement of claim 1 wherein the first heated aqueous stream is heated indirectly by the intercooler by an intermediate heat transfer fluid.

12. In a method for producing a distillate stream from a first aqueous steam containing at least one dissolved solid by a multi-effect distillation process by heating at least a portion of the distillate stream by a heat source and passing the portion of the distillate stream to a multi-effect distillation process which comprises a plurality of vessels; the improvement comprising; heating the portion of the distillate stream by heat exchange with a heat source comprising at least one of a compressor intercooler or a stack heater to produce a heated distillate stream and passing the heated distillate stream to the multi-effect distillation process as at least one of a heat supply and a feed water stream to produce the distillate stream, wherein a second aqueous stream containing at least one dissolved solid is withdrawn from the multi-effect distillation process at a selected temperature and passed to heat exchange with an exhaust gas stream in a stack heater to produce a second aqueous stream containing at least one dissolved solid at an increased temperature and returned to the multi-effect distillation process, and wherein the heated distillate stream is passed to a multi-effect distillation process via a flash box.

13. The improvement of claim 12 wherein the heat source comprises a compressor intercooler.

\* \* \* \* \*